United States Patent
Camacho Cardenas et al.

(10) Patent No.: US 12,142,929 B2
(45) Date of Patent: *Nov. 12, 2024

(54) RIG POWER MANAGEMENT SYSTEM

(71) Applicant: Schlumberger Technology Corporation, Sugar Land, TX (US)

(72) Inventors: Alejandro Camacho Cardenas, Singapore (SG); David Robert Evan Snoswell, Cambridge (GB)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 18/519,275

(22) Filed: Nov. 27, 2023

(65) Prior Publication Data

US 2024/0088675 A1    Mar. 14, 2024

Related U.S. Application Data

(63) Continuation of application No. 17/044,351, filed as application No. PCT/US2019/035142 on Jun. 3, 2019, now Pat. No. 11,831,166.

(Continued)

(51) Int. Cl.
*H02J 3/46* (2006.01)
*G05B 19/042* (2006.01)
(Continued)

(52) U.S. Cl.
CPC ............. *H02J 3/46* (2013.01); *G05B 19/042* (2013.01); *H02J 7/143* (2020.01); *H02J 7/1438* (2013.01);
(Continued)

(58) Field of Classification Search
CPC .. H02J 3/46; H02J 7/143; H02J 7/1438; H02J 13/00002; H02J 2300/10; H02J 2310/10;
(Continued)

(56) References Cited

U.S. PATENT DOCUMENTS

2009/0312885 A1* 12/2009 Buiel .................. H02J 3/32
                                                          700/297
2013/0234515 A1*  9/2013 Boone ................ E21B 44/00
                                                          307/43
(Continued)

FOREIGN PATENT DOCUMENTS

WO    2008102166 A1    8/2008
WO    2011126661 A2   10/2011

OTHER PUBLICATIONS

International Search Report and Written Opinion issued in International Patent Application No. PCT/US2019/035142 dated Dec. 5, 2019, 14 pages.

(Continued)

*Primary Examiner* — Ziaul Karim
(74) *Attorney, Agent, or Firm* — Jeffrey D. Frantz (57) ABSTRACT

A system for monitoring and optimizing fuel consumption by a genset at an oil rig is described. Gensets require large amounts of fuel to initiate and to maintain in a standby, idling position. The system accesses data in a drill plan to determine the present and future power requirements and initiates gensets if needed; otherwise gensets can be shut down. Excess power can be stored in a power storage unit such as a capacitor, battery, or a liquid air energy storage unit.

21 Claims, 6 Drawing Sheets

Related U.S. Application Data (60) Provisional application No. 62/679,373, filed on Jun. 1, 2018.

(51) Int. Cl.
  *H02J 7/14* (2006.01)
  *H02J 13/00* (2006.01)

(52) U.S. Cl.
  CPC ............... *H02J 13/00002* (2020.01); *G05B 2219/25061* (2013.01)

(58) Field of Classification Search
  CPC .. H02J 3/0075; H02J 3/32; H02J 3/381; H02J 3/466; H02J 3/472; H02J 3/48; H02J 3/003; G05B 19/042; G05B 2219/25061; Y02E 40/70; Y04S 10/12
  See application file for complete search history.

(56) References Cited

U.S. PATENT DOCUMENTS

| | | | |
|---|---|---|---|
| 2014/0077600 A1* | 3/2014 | Cryer | E21B 41/00 307/48 |
| 2018/0284758 A1* | 10/2018 | Cella | H04L 1/18 |
| 2019/0041835 A1* | 2/2019 | Cella | G05B 23/0286 |
| 2019/0267805 A1* | 8/2019 | Kothuru | H02J 13/00002 |
| 2021/0104895 A1 | 4/2021 | Camacho Cardenas | |

OTHER PUBLICATIONS

International Preliminary Report on Patentability issued in Interntional Patent Application No. PCT/US2019/035142 dated Dec. 10, 2020, 11 pages.

* cited by examiner

RIG POWER MANAGEMENT SYSTEM

This application is a continuation of U.S. Non-Provisional application Ser. No. 17/044,351, now U.S. Pat. No. 11,831,166, which is a National Phase filing of PCT Application No. PCT/US2019/035142, filed Jun. 3, 2019, which claims priority to and the benefit of U.S. Provisional Application No. 62/679,373, filed Jun. 1, 2018, all of which are incorporated herein by reference.

BACKGROUND

In the oilfield there are many large-scale operations that consume relative large amounts of fuel and output similarly large amounts of power. One popular way to achieve the power required is referred to commonly as a "genset," consisting of a combination of a prime mover (such as an engine) and an alternator. The prime mover converts the chemical energy of fuel to a mechanical energy. Gensets are large and can consume many gallons of diesel fuel per day. The demands of a modern oil rig require a certain amount of power to be available at a moment's notice so for much of the time gensets are set to idle, which consumes fuel. There is a need in the art for an increased efficiency with the use of gensets.

SUMMARY

Embodiments of the present disclosure are directed to systems for managing fuel expenditures at an oil rig. The systems may include a plurality of gensets, individual gensets comprising a prime mover and an alternator. The system also includes a load operatively coupled to one or more of the gensets and being configured to receive power from the gensets to execute one or more tasks at the oil rig. The system also includes a controller operatively coupled to the gensets and the load. The controller is configured to monitor power consumption by the load and to monitor an operating status of the gensets. The system also includes a database being configured to store a drill plan detailing the tasks including power consumption and duration for the tasks. The controller is configured to calculate a total expected power consumption for tasks at a certain time period, identify a number of gensets necessary to provide sufficient power to execute the tasks at the certain time period, and to ensure that the number of gensets necessary are running at a sufficient level at the certain time.

In further embodiments the system further includes a power storage unit operatively coupled to one or more of the gensets and being configured to receive power from one or more of the gensets and to store the power for later use. The power storage unit is also being operatively coupled to the load and configured to deliver the power stored in the power storage unit to the load to execute one or more of the tasks. In further embodiments the controller is further configured to analyze data in the drill plan pertaining to a second time later than the certain time, calculate a second total expected power consumption for tasks at the second time, identify a number of gensets necessary to provide sufficient power to execute the tasks at the second time period, and to ensure that the number of gensets necessary are running at a sufficient level at the second time.

Further embodiments of the present disclosure are directed to a method for optimizing fuel consumption by gensets at an oil rig. The method includes accessing a rig plan including data describing times and power consumption loads associated with a plurality of tasks at the oil rig and, for a given time period, summing the power consumption loads for the tasks scheduled during the given time period in the rig plan. The method also includes calculating a number of gensets required to provide sufficient power for the tasks scheduled during the given time period while allowing at least a predetermined quantity of headroom power in addition to the summed power consumption loads, and ensuring that sufficient gensets are running at the given time. The method can also include diverting the headroom power to a power storage unit, and accessing the headroom power stored in the power storage unit as required by the tasks.

Further embodiments are directed to methods which include monitoring a power consumption associated with a specific task, comparing the power consumption load in the rig plan for the specific task, and issuing an alarm if a difference between the power consumption associated with the specific task differs from the power consumption load in the rig plan for the specific task by an amount greater than a predetermined threshold.

Yet further embodiments of the present disclosure are directed to a system for managing a plurality of gensets at an oil rig. The system includes a plurality of gensets configured to consume fuel and deliver power, a load configured to receive power from the gensets, the load defining a drilling operation at the oil rig. Power consumption and scheduling data for the load is described in a drill plan. The system also includes a power storage unit configured to receive power from at least one of the gensets and to deliver the stored power to the load as needed, and a computational unit configured to monitor the gensets, monitor the load, access the drill plan to determine how much power will be required at a given time during the drilling operation, and to ensure that a sufficient number of gensets are running at the given time to meet the power demands of the load. The computational unit is further configured to monitor the power storage unit for capacity and availability of power, to divert power to the power storage unit when the power is not needed for the load, and to access power stored in the power storage unit when the load exceeds the available power from the gensets.

In still further embodiments the system includes a system health monitoring component configured to monitor actual power consumed for specific tasks in the load and to compare the actual power consumed to corresponding data in the drill plan, and if they differ by more than a predetermined tolerance value, the system health monitoring component is configured to notify an operator.

DETAILED DESCRIPTION

Figure 1:
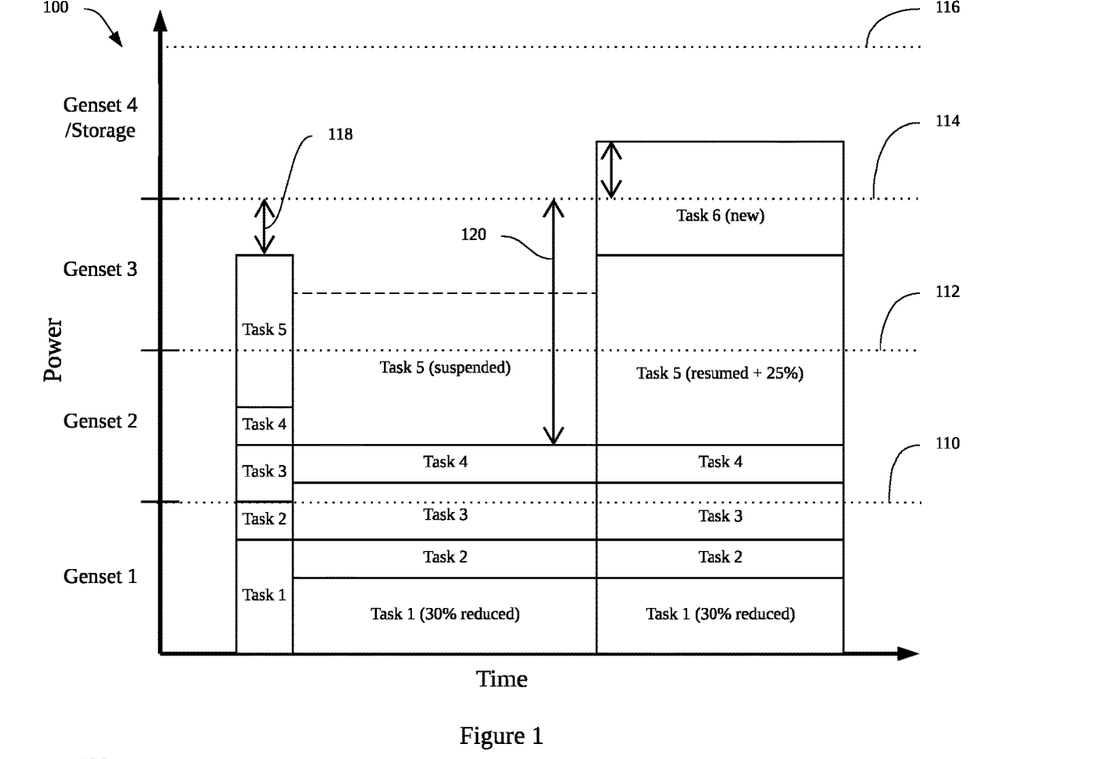
FIG. 1 is a graph of power and time according to embodiments of the present disclosure.

Below is a detailed description according to various embodiments of the present disclosure. FIG. 1 is a graph 100 of power and time according to embodiments of the present disclosure. Power is on the vertical axis and is represented by gensets 1-3 and a fourth genset which can be periodically interchanged with a storage unit. The power delivery capabilities of each of gensets 1-4 is shown at 110, 112, 114, and 116. The total demand for power at the first instance of time on the graph 100 will require the power of gensets 1 and 2 and some portion of genset 3. The load on the gensets that requires this power is tasks 1-5 which together amount to slightly less than what is provided by gensets 1-3. The difference, or headroom 118 between the required power and available power is shown by the arrow. From time-to-time the power demands change. At the second instance of time shown task 1 has been reduced by 30%, tasks 2-4 continue unchanged, and task 5 has been suspended altogether. The headroom 120 is therefore larger and the total power demand is less than the power provided by gensets 1 and 2. Accordingly, genset 3 can be powered down during this time. At the third instance of time tasks 1-4 are the same as they were at the second instance of time but task 5 has been resumed with an additional 20% required, and a new task 6 has been initiated. The total power demand is therefore greater than what is provided by gensets 1-3 and genset 4, or power from a storage unit, is required.

The numbers and relative positions of the tasks and gensets shown in FIG. 1 can vary greatly. The tasks can be anything on an oil rig such as drawworks, a top drive, or any of hundreds of possible tasks that require power during a rig operation. There may be any number of gensets and they are not necessarily in a preferred order. In some embodiments the gensets can be rotated to distribute load more evenly to avoid wear on one genset over another. The time for a task is also variable and can be short such as a few seconds, or long such as days or months of use. It is to be appreciated that the number of tasks and possible combinations of tasks can be immense.

Figure 2:
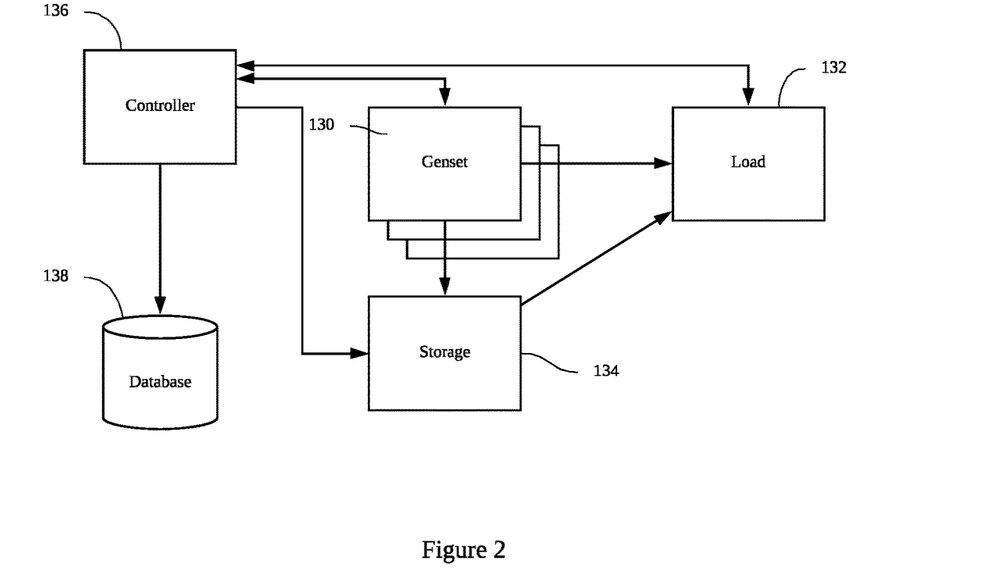
FIG. 2 shows a relationship between genset, load, and storage unit according to embodiments of the present disclosure.

FIG. 2 shows a relationship between genset 130, load 132, and storage unit 134 according to embodiments of the present disclosure. Recall the relationship between headroom and available power shown in FIG. 1 as well. The genset 130 provides power to the load 132. The genset 130 can also be configured to provide power to a storage unit 134 which can consist of a battery, a capacitor, or any other suitable power storage unit. Excess power from the genset 130 can be diverted to the storage unit and stored for later use. In some embodiments the storage unit 134 can supply the power required during a certain time when demand for power exceeds the available power provided by a number of gensets. There is a fuel cost associated with starting a genset, and if a power demand can be met by tapping into stored power it could result in large efficiency gains. The gensets and their available power can be considered in discrete intervals, and this effect is of even more importance because the efficiency of the gensets is highest near the maximum operating capacity. On the other hand, slowing down an oil rig operation because there is insufficient power available is costly. There is a desirable balance between reducing idle time and providing as near to exactly the power required.

A controller 136 can be operatively coupled to the genset 130, the load 132, and the storage unit 134 by a series of sensors and telemetry equipment. The controller can be configured to monitor the required power and the current demands for power. A database 138 is coupled to the controller 136. The database 138 can be any suitable data storage component or memory capable of storing data as is known in the art. The controller 136 stores data relating to the power demands of the various tasks that will comprise the load 132. The controller 136 can also monitor the operating states of the gensets and information about the gensets such as efficiency rate, fuel consumption, running time, available capacity, etc. The controller 136 can calculate the headroom available at any given time.

The controller 136 can be a programmable logic controller (PLC) a computer such as a desktop or laptop computer, or can be any other suitable computational device including a mobile device such as a smartphone or a tablet. The database 138 can be any type of storage medium such as a hard drive, solid state drive, or server. The storage unit 134 can be any suitable type of energy storage unit with sufficient capabilities to meet the demands of the rig. Some supercapacitors can store 1.1 MW/3.3 kWhr or more to provide up to 3.7 seconds of rig time. Some batteries can provide 1 MW/450 kWhr to achieve 8.4 minutes of rig time. Another type of storage is liquid air energy storage (LAES) which can provide 516 kWhr/10,000 liters to achieve 9.7 minutes or rig time. These are some examples of the amount of storage available for use with the systems and methods of the present disclosure. There can be multiples of these items in any combination to achieve even more available power quantities.

The database 138 can store a drill plan detailing upcoming tasks scheduled for the load 132. The drill plan can also be called a rig plan and can be a sequence of operations or tasks that are to be executed on the rig and an associated power requirement. With this information available ahead of time, the controller 136 can be configured to monitor the current status of power and demands and calculate headroom, and it can also predict future demands. For example, referring to FIG. 1, during the first instance of time the drill plan may call for the suspension of task 5 at a certain time in the near future. The controller 136 can initiate a shutdown of genset 3 at a precise time to achieve increased efficiency by reducing or eliminating time that genset 3 is running but not needed. In some embodiments genset 3 can even be shutdown moments before task 5 is to be suspended. The controller 136 and database 138 can know when to shut down genset 3 to achieve increased efficiency.

Figure 3:
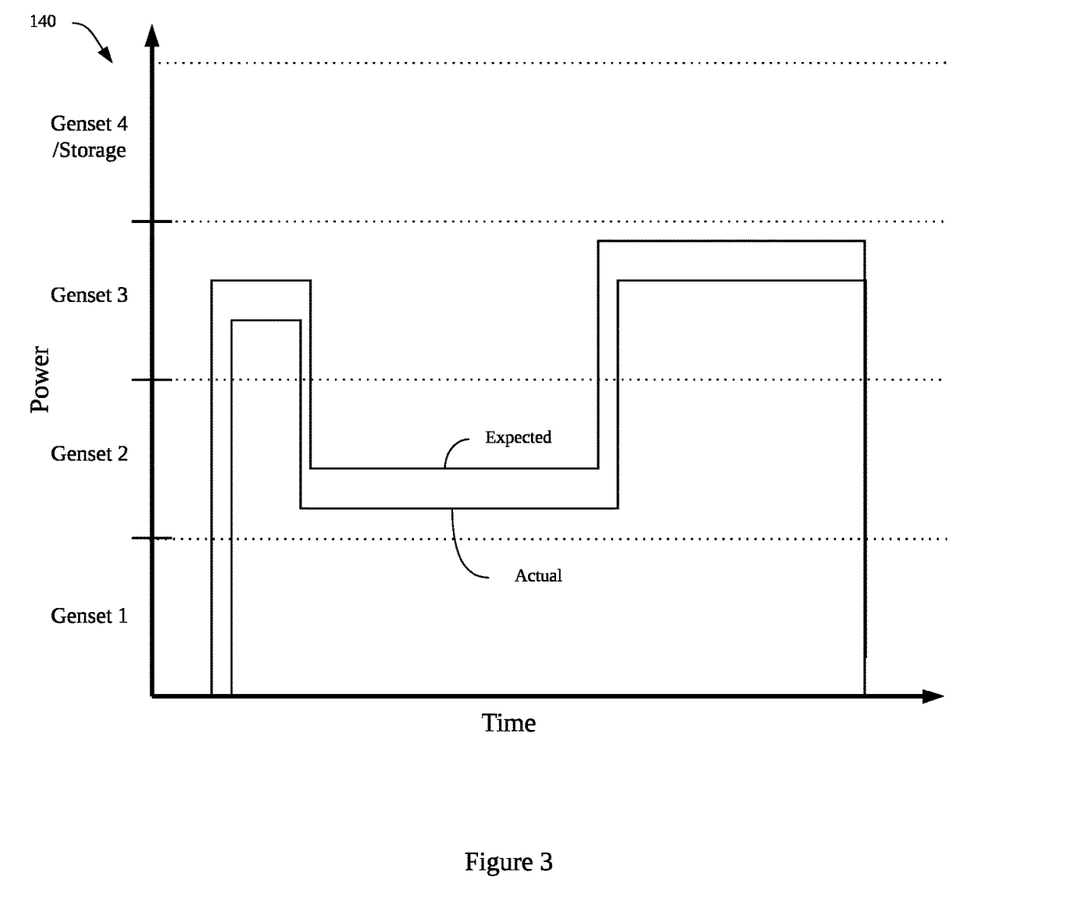
FIG. 3 is a graph of expected and actual power delivery according to embodiments.

The database 138 can store information generated by the controller 136 obtained by monitoring tasks executed by the load 132 and the power actually used by the load 132. FIG. 3 is a graph 140 of expected and actual power delivery according to embodiments. In this embodiment the expected power is higher than the actual power at each stage in the process. Of course the graph 140 may vary greatly depending on a given configuration. This is empirical data describing individual tasks and the actual power required to execute the task. The controller 136 can compare the expected power requirement for a given task to the actual, empirical data obtained by monitoring the task. If the empirical data suggests it, the controller 136 can update the value associated with a given task in the database 138. In some embodiments the controller 136 can be programmed with a variance tolerance and if the difference between expected and empirical power is greater than the variance tolerance the controller 136 can take action either to issue an alarm or to update the values for the expected.

Trends may appear in the power consumption of a given task which can indicate system health may be deteriorating. Over time and use gensets will become more inefficient and this expected wear and tear can be factored into the variance tolerance. But if a certain task is consistently requiring more power, an alarm can be issued to alert an operator.

Fuel consumption can also be factored in to the calculus. For example, in some embodiments the power delivered can be held constant to achieve the same power output to execute a given task, but more fuel was required. This can also be an indicator of system health deterioration. In other embodiments the fuel can be held constant and the decline in resulting power delivered can be observed.

When there is a deviation from expected power delivery, the controller 136 can be programmed to identify patterns in the tasks that may account for the deviation. When a deviation is identified, the tasks running at the time of the deviation (or perhaps also beforehand) can be recorded to check for patterns if the same or similar deviation were to occur again.

Armed with this data from the drill plan, the controller 136 can operate the gensets 130 and the storage unit 134 together in concert to reduce or eliminate wasteful idling, while providing the load 132 with sufficient operating power without costly downtime.

Figure 4:
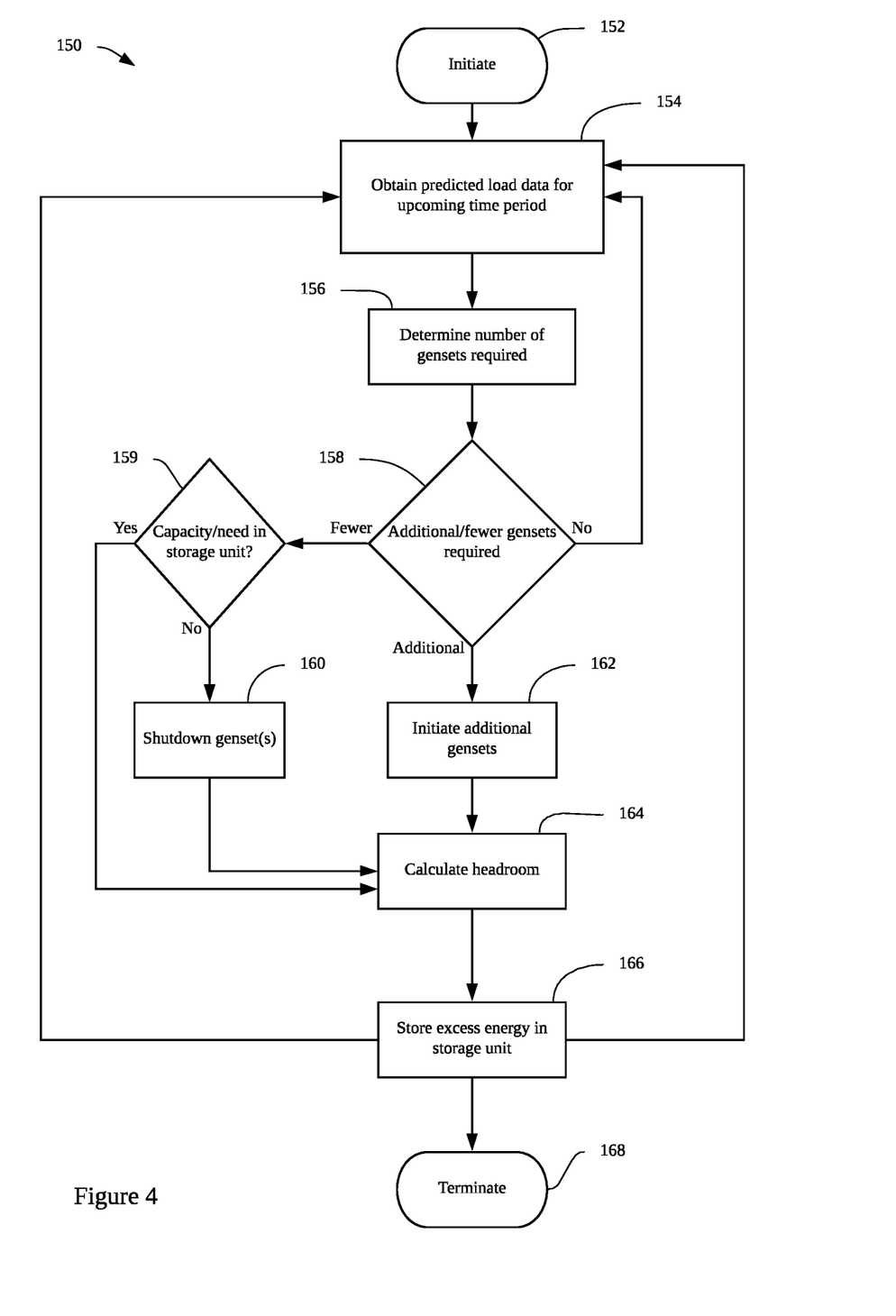
FIG. 4 is a flowchart of a method for operating a plurality of gensets and one or more storage units with a controller according to embodiments of the present disclosure.

FIG. 4 is a flowchart of a method 150 for operating a plurality of gensets and one or more storage units with a controller according to embodiments of the present disclosure. At 152 the method initiates either at the request of an operator or automatically in response to a signal, a predetermined time period, or the occurrence of some other operation or event at the rig. The method 150 can be carried out locally by a controller or can be remotely operated over communication lines such as WIFI or the internet. At 154 the method includes obtaining a predicted load data for an upcoming time period. Such data can be part of a drill plan stored on a local database or accessed over long-range communication lines. The data can include a list of tasks to be executed during the time and an associated power requirement for each. The time period can be any time period long or short. At 156 it is calculated how many gensets will be required to deliver the required power. In some embodiments this is as simple as summing the power required by the tasks to be executed. In other embodiments the tasks interrelate in such a way that the power requirements for two tasks together is different than it would be for either alone.

At 158 a query is executed to determine if there is a need for additional or fewer gensets than the number currently running. If there is no such need, the method can return to 154 by obtaining the next upcoming time period and the associated load. If there is a need for fewer gensets, the method can then determine at 159 whether or not there is capacity and/or need to charge a power storage unit. If not, at 160 the genset is shut down. Within the determination that there are fewer gensets required is the time and fuel cost associated with shutting down and starting up the genset. While the exact numbers for such a decision will depend on the particulars of a given genset and task, the time period during which the genset will not be needed and the fuel and wear and tear cost of a shutdown/startup cycle are factored into the decision. If there is a need and capacity in a storage unit at 164 headroom is calculated at 164 and at 166 the excess energy produced is diverted to the storage unit. The method can continue by directing control back to 154 by obtaining the next time period for analysis, or the method can terminate at 168.

Figure 5:
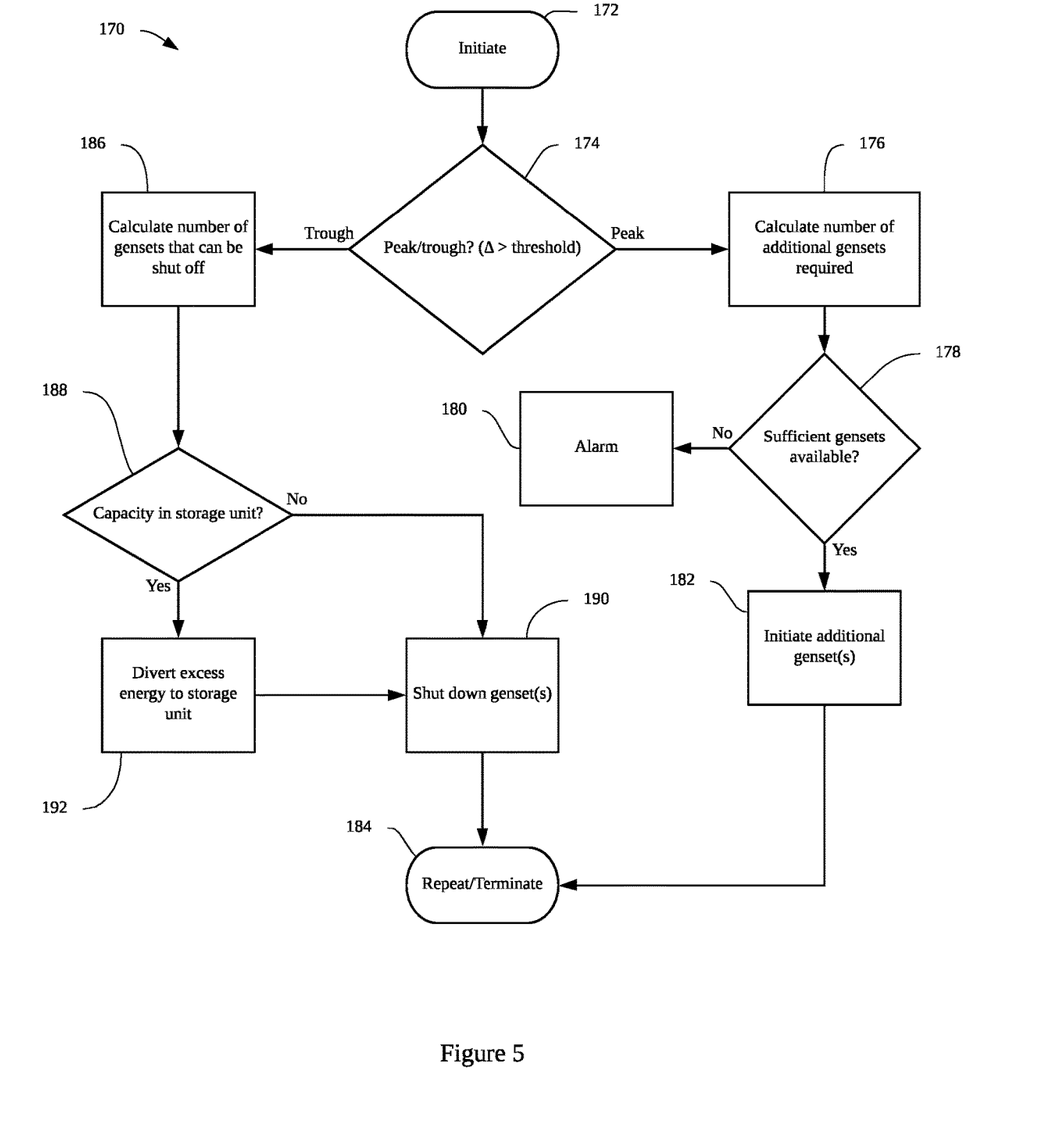
FIG. 5 is another flowchart for of a method of operating genset(s), controllers, and loads to improve efficiency according to embodiments of the present disclosure.

FIG. 5 is another flowchart for of a method 170 of operating genset(s), controllers, and loads to improve efficiency according to embodiments of the present disclosure. At 172 the method is initiated. At 174 a decision is made based on the drill plan data and the current load on the genset(s) whether or not a peak or trough is coming. The determination can be based on a difference between the current power consumption and the expected upcoming power consumption. If the difference A is greater than a threshold, larger indicates a peak, and smaller indicates a trough. If neither is determined, the method can continue periodic checks. When a peak is identified at 176 a calculation is made to determine a number of additional gensets that will be required to meet the demand. In some embodiments this determination is made by summing the power requirements of all the expected tasks and comparing it against the power delivery as shown in FIG. 1. At 178 the method includes determining whether or not there are sufficient gensets available, which can include any storage units which may be tapped, to meet the demand. At 180 if there are insufficient gensets and storage units available, an alarm is issued. If there are sufficient gensets available at 182 they are initiated. The method continues at 184 by repeating or terminating.

If a trough is identified at 186 a calculation is made to identify the number of gensets that can be shut off. This determination can take into account the time for the expected trough and the cost of a shutdown/startup cycle. At 188 a determination can be made of whether or not there is capacity and/or need in one or more storage units. If not, the method continues at 190 by shutting down the genset(s). If there is capacity and need in the storage unit, the energy is diverted to the storage unit at 192. The method then continues by repeating or terminating. In some embodiments the method can continue in the absence of a command to terminate. In other embodiments the method executes once per instance of receiving a new time period for analysis from the drill plan. In some embodiments the method continues periodically without regard to the timing and information in the drill plan.

Figure 6:
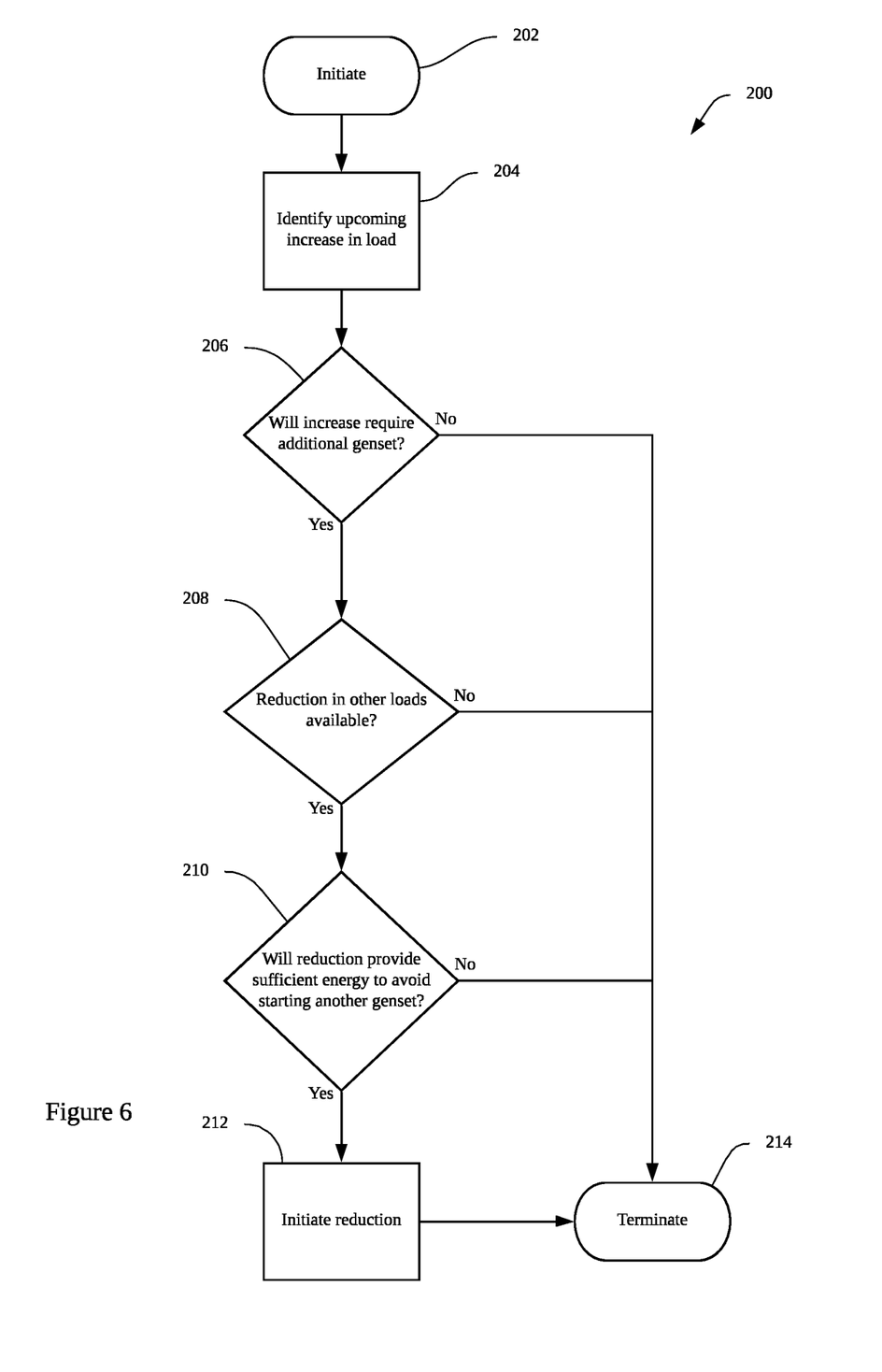
FIG. 6 is another flowchart diagram of a method for operating one or more gensets to provide power to a load with increased efficiency and reduced idling time according to embodiments of the present disclosure.

FIG. 6 is another flowchart diagram of a method 200 for operating one or more gensets to provide power to a load with increased efficiency and reduced idling time according to embodiments of the present disclosure. At 202 the method initiates. At 204 a controller or other suitable computing apparatus identifies upcoming increases in load. The information for the controller to make this identification comes from a drill plan that is stored in a database either locally or remotely. The controller can compare the current load against the planned load. At 206 the controller can determine whether or not the increased load will require initiating an additional genset above the number that are currently operating. If not, the method can repeat or terminate at 214. If so, the controller can then at 208 look to see if there are available reductions in other loads that may allow the upcoming demand to be met without requiring the use of an additional genset. If not, the method passes to repeat or terminate at 214. If there are other loads that may be reduced, at 210 the controller can query whether or not the reductions will provide sufficient energy to avoid starting another genset. If not the method passes to repeat/terminate at 214. If there are sufficient loads that can be reduced, either by postponing, delaying, diminishing, or otherwise redistributing the load to avoid needing another genset, at 212 the controller initiates the reduction. Afterward the method can repeat/terminate at 214.

A reduction in load can come in many forms, including reducing intensity, delaying a task, redistributing a load from one piece of equipment to another, or by shutting down certain processes and tasks temporarily or indefinitely. The cost of the reduction can also be factored in. The cost of the reduction can be measured in terms of the energy required to startup, shut down, or redistribute loads, as well as the impact on the drill plan. If a reduction will cause the entire rig to delay by, say, one hour than the efficiency gains achieved by the reduction are not worth the cost.

The controller can normalize these decisions by comparing a monetary value. Idling the genset consumes fuel which has a price that can be measured and applied. Also, the cost of a potential delay can also be expressed in terms of the cost it will incur. Rig time is notoriously expensive, so if any proposed reduction increases rig time it is likely not worth doing. The controller can execute these decisions with the help of input from an operator to arrange the parameters of the costs (both in terms of energy and money) associated with each.

Figure 7:
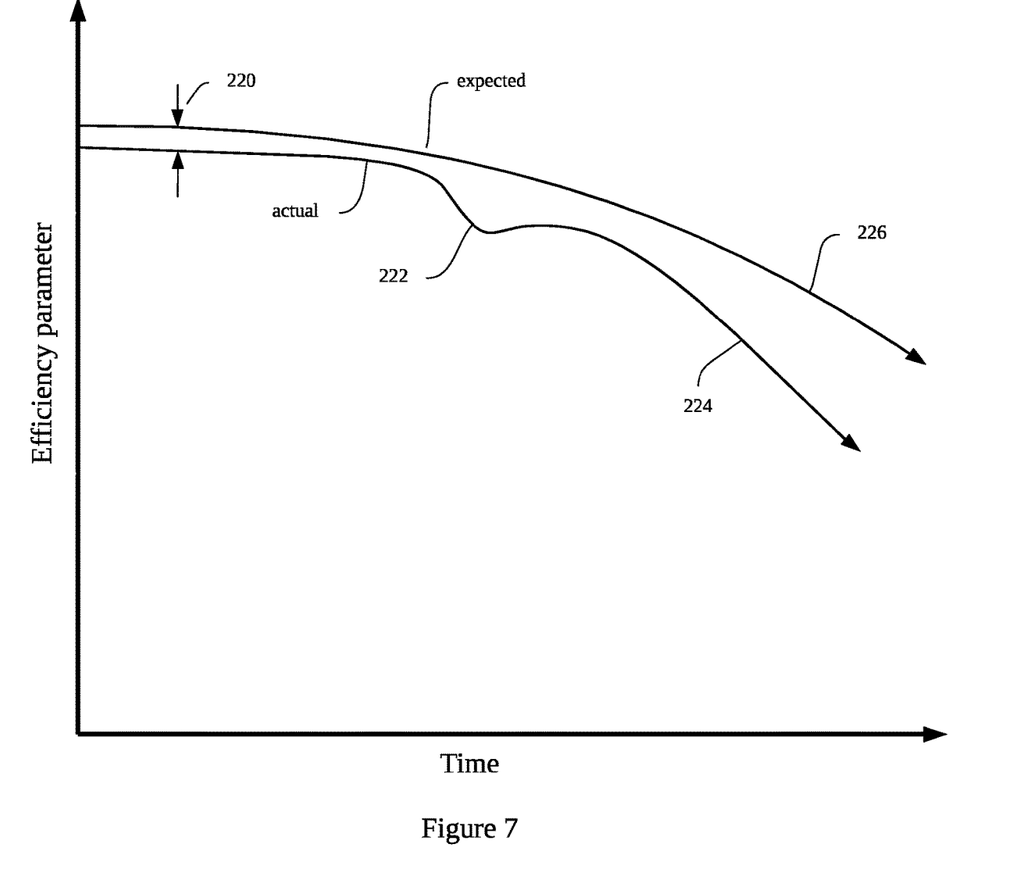
FIG. 7 is a graph of expected efficiency performance of a genset or associated systems against actual efficiency performance to identify potential system health issues according to embodiments of the present disclosure.

FIG. 7 is a graph of expected efficiency performance of a genset or associated systems against actual efficiency performance to identify potential system health issues according to embodiments of the present disclosure. There are two plots: expected performance, and actual performance. The two lines are offset by an offset 220 to more clearly illustrate the differences and similarities of the two plots. All equipment will deteriorate at one rate or another. Much of the equipment used with the present disclosure including the gensets and the machine and systems that make up the load has a known or expected deterioration rate. This can be based on track record or empirical monitoring. Actual deterioration can be measured and compared against the expected deterioration rate and if there is a deviation great enough, an alarm can be issued to alert an operator of potential system health issues. For example, a dip at 222 shows a relatively sudden drop in efficiency performance that can be indicative of a problem. In some embodiments operations can be halted if the deviation is sufficiently severe. The actual performance plot in this case does improve and appear to return to a normal value, so in that case the system can conclude that there were transient conditions that have been resolved and there are no system health issues. Later in the plot, however, the relative slope of the plots at 224 and 226 appear to be diverting. This can be an indicator of a slower, steadier decline in efficiency. In many embodiments there are more factors at play, such as perhaps a genset is being run outside of an optimal power band for reasons beyond the purview of a system health monitoring system such as this. In these cases, perhaps there is a good reason for the decline. In any case, however, the decline can be monitored and documented.

The vertical axis of the graph is labeled generically "efficiency parameter." In some embodiments this can be an amount of fuel required to perform a given task. In other embodiments the amount of fuel is held constant and the performance (e.g. torque) can be monitored for a decline. In still other embodiments a combination of fuel and performance can be used to plot the efficiency parameter against time. However the efficiency is defined, the systems and methods of the present disclosure allow a novel, useful way to monitor system health, to provide sufficient power to meet the demands of the modern oil rig, and to avoid wasteful, costly, avoidable fuel expenditures associated with idling extra gensets.

In some embodiments the drill plan can be written using the available number of gensets as a constraint. The systems and methods of the present disclosure can be used to set certain parameters and scheduling for a rig. For example, a certain well can be desired to operate using only three gensets. The scheduling from day one can be written in a way that optimizes the use of these gensets without requiring a fourth genset. There is greater control and flexibility provided by the systems and methods of the present disclosure than were previously available.

The foregoing disclosure hereby enables a person of ordinary skill in the art to make and use the disclosed systems without undue experimentation. Certain examples are given to for purposes of explanation and are not given in a limiting manner.

The invention claimed is:

1. A system comprising:
a plurality of gensets, each genset of the plurality of gensets comprising a prime mover and an alternator;
a load operatively coupled to at least one of the plurality of gensets, wherein the load is configured to:
receive power from the at least one of the plurality of gensets and a power storage unit; and
execute at least one task at an oil rig;
the power storage unit, wherein the power storage unit is operatively coupled to at least one of the plurality of gensets and to the load, and wherein the power storage unit is configured to:
store power from the at least one of the plurality of gensets; and
deliver the stored power to the load;
a controller operatively coupled to the plurality of gensets, the power storage unit, and the load, wherein the controller is configured to monitor power consumption by the load, a power capacity of the power storage unit, and an operating status of the plurality of gensets, wherein the operating status includes whether the gensets of the plurality of gensets are active or inactive; and
a database configured to store a drill plan detailing at least one of: the at least one task, power consumption for the at least one task, or a duration for the at least one task,
wherein the controller is further configured to:
determine, based on the drill plan, a total expected power consumption for the at least one task at a first time period;
ensure, based on the operating status of the plurality of gensets and the power capacity of the power storage unit, a number of gensets are running at a first time period to provide power equal to an expected power consumption to execute the at least one task at the first time period;
monitor a power consumption associated with the at least one task during the first time period;
compare the monitored power consumption to the expected power consumption for the at least one task; and
issue an alarm if the monitored power consumption associated with the at least one task differs from the expected power consumption for the at least one task by an amount greater than a predetermined threshold.

2. The system of claim 1, wherein the power storage unit is configured to receive regenerated power from the plurality of gensets.

3. The system of claim 1, wherein the power storage unit comprises at least one of: a capacitor, a battery, a hydraulic energy storage unit, a pneumatic energy storage unit, or a flywheel.

4. The system of claim 1, wherein the controller is further configured to:
calculate a second expected power consumption to execute at least one task task at a second time period; and
ensure a second number of gensets are running at the second time period to provide power equal to the second expected power consumption during at the second time period.

5. The system of claim 1, wherein the controller is further configured to, when the number of gensets to provide the expected power consumption is less than a number of active gensets, prioritize instructing the power storage unit to deliver the stored power to the load over turning on an additional genset to provide the power equal to the expected power consumption at the first time period.

6. The system of claim 1, wherein the load comprises at least one of: a top drive, a drawworks, or a mud pump.

7. The system of claim 1, wherein the controller is further configured to:
calculate a difference between the expected power consumption and an available power production capacity from a number of active gensets of the plurality of gensets as headroom power; and
instruct at least one of the active gensets to deliver the headroom power to the power storage unit.

8. The system of claim 7, wherein the controller is further configured to verify there is available storage capacity in the power storage unit.

9. The system of claim 1, further comprising a system health monitoring component configured to monitor health of the system by:
measuring a power consumption of a task of the at least one task executed by the load and powered by a genset of the plurality of gensets; and
comparing the power consumption of the task to the expected power consumption for the task in the drill plan.

10. The system of claim 1, wherein:
the controller being configured to monitor power consumption by the load includes the controller being configured to monitor power consumption of a task of the at least one task; and
the system further comprises a power prediction component configured to:
compare the power consumption of the task to the expected power consumption for the task in the drill plan; and
update the drill plan based on the comparison between the monitored power consumption and the expected power consumption for the task.

11. The system of claim 10, wherein the drill plan is generated by predictive mathematical models, and wherein updating the drill plan comprises updating the predictive mathematical models.

12. The system of claim 1, further comprising a genset health monitoring component configured to monitor health of a genset of the plurality of gensets by:
measuring power output of the genset;
accessing the drill plan for an expected value of power output of the genset; and
comparing the power output of the genset to the expected value of power output of the genset.

13. The system of claim 1, wherein the controller is further configured to, when the number of gensets to provide the total expected power consumption is greater than the number of active gensets, determine whether to reduce the load.

14. The system of claim 13, wherein the controller is further configured to:
calculate at least one of: a cost of increased rig operation time associated with reducing the load, a fuel cost of at least one idle genset of the plurality of gensets, a fuel cost associated with shutting down and starting up at least one genset of the plurality of gensets, a cost associated with an expected duration that the number of gensets to provide the total expected power is less than the number of active gensets, a cost associated with an expected duration that the number of gensets to provide the total expected power is greater than the number of active gensets, or a combination thereof; and
determine, based on the calculated cost, whether to:
turn on at least one additional genset at or before the first time period,
instruct the power storage unit to deliver stored power to the load at the first time period;
shut down the at least one of the active gensets at or before the first time period; or
instruct the at least one of the gensets to deliver excess power to power storage unit at the first time period.

15. A method comprising:
accessing a drill plan including data detailing at least one task executed at an oil rig, a duration for the at least one task, or power consumption for the at least one tasks;
determining an expected power consumption for the at least one task scheduled during a first time period;
ensuring a power equal to the expected power consumption at the first time by:
when a current power consumption exceeds the expected power consumption by a first threshold amount, deactivating at least one active genset or delivering the difference in the power from the active gensets to a power storage unit during the first time period; and
when the difference between the current power consumption is less than the expected power consumption by a second threshold amount, activating at least one inactive genset or delivering the power stored in the power storage unit to a load to execute the at least one task;
monitoring a power consumption associated with the at least one task during the first time period;
comparing the monitored power consumption to the expected power consumption for the at least one task; and
issuing an alarm if the monitored power consumption associated with the at least one task differs from the expected power consumption for the at least one task by an amount greater than a predetermined threshold.

16. The method of claim 15, wherein the the first and second threshold amounts are predetermined to optimize at least one of: fuel consumption, load, wear, maintenance, number of startup cycles, or number of shutdown cycles.

17. The method of claim 15, further comprising calculating a startup cost or a shutdown cost associated with a power cycle for a genset.

18. The method of claim 15, wherein:
deactivating the at least one active genset or delivering the difference in the power from the active gensets to the power storage unit during the first time is based on assessing whether or not there is sufficient capacity in the power storage unit to store the difference in the power; and
activating the at least one inactive genset or delivering the power stored in the power storage unit to the load to execute the at least one task is based on assessing whether or not there is sufficient power stored in the power storage unit to deliver the difference in the power.

19. A system comprising:
a plurality of gensets configured to consume fuel and deliver power;
a load configured to receive power from the plurality of gensets, the load being associated with a drilling operation at an oil rig;
a power storage unit configured to:
  store power received from at least one of the plurality of gensets; and
  deliver the stored power to the load; and
a computational unit configured to:
  monitor an operating status of the plurality of gensets, the load, and a capacity of the power storage unit;
  access a drill plan including power consumption data and scheduling data for the load;
  determine, based on the drill plan, an expected power consumption at a first time period during the drilling operation; and
  ensure, based on the operating status of the plurality of gensets and the power capacity of the power storage unit, the expected power consumption is provided to the load during the first time period by:
    when a number of gensets to provide the expected power consumption is greater than a number of active gensets:
      shutting down at least one of the active gensets at or before the first time period;
      diverting excess power from the at least one active genset to the power storage unit during the first time period; or
      a combination thereof; and
    when the number of gensets to provide the expected power consumption is less than the number of active gensets:
      turning on at least one additional genset at or before the first time period;
      accessing power stored in the power storage unit during the first time period; or
      a combination thereof; and
  monitor a power consumption associated with at least one task during the first time period;
  compare the monitored power consumption to the expected power consumption for the at least one task; and
  issue an alarm if the monitored power consumption associated with the at least one task differs from the expected power consumption for the at least one task by an amount greater than a predetermined threshold.

20. The system of claim 19, wherein the plurality of gensets comprise diesel engines capable of providing at least one megawatt of power.

21. The system of claim 19, wherein the computation unit is configured to, when the number of gensets to provide the expected power consumption is less than the number of active gensets, prioritize accessing power stored in the power storage unit over turning on the at least one additional genset.

* * * * *